Patent [19] [11] 4,078,966
Verdeau [45] Mar. 14, 1978

[54] SYSTEM FOR THE EMERGENCY INJECTION OF LIQUID INTO A NUCLEAR REACTOR CORE

[75] Inventor: Jean-Jacques Verdeau, Gif-sur-Yvette, France

[73] Assignee: Commissariat a l'Energie Atomique, Paris, France

[21] Appl. No.: 557,432

[22] Filed: Mar. 11, 1975

[30] Foreign Application Priority Data

Mar. 12, 1974 France .................................. 74 08376

[51] Int. Cl.² .............................................. G21C 9/00
[52] U.S. Cl. ........................................ 176/38; 176/50; 176/61
[58] Field of Search ................... 176/37, 38, 50, 86 L, 176/61

[56] References Cited

U.S. PATENT DOCUMENTS 3,205,146  9/1965  Hackney ................................ 176/38
3,346,459  10/1967  Prince et al. ........................... 176/61
3,528,884  9/1970  Collier et al. .......................... 176/37
3,816,245  6/1974  Bevilacqua ............................. 176/61
3,839,150  10/1974  Porter ................................... 176/51
3,920,514  11/1975  Calvin .................................. 176/38

FOREIGN PATENT DOCUMENTS 790,698  7/1968  Canada.
7,038,120  11/1966  Japan ..................................... 176/38

Primary Examiner—Verlin R. Pendegrass
Assistant Examiner—Ralph Palo
Attorney, Agent, or Firm—Sughrue, Rothwell, Mion, Zinn and Macpeak

[57] ABSTRACT

The pressure vessel of a reactor such as a PWR is provided with nozzles for the emergency injection of coolant into at least one water-box placed above the reactor core and rigidly fixed to the pressure vessel. Sprinkler-tubes placed within the fuel assemblies in parallel relation to the fuel pins are each connected to the water-box by means of a rectilinear tube.

1 Claim, 4 Drawing Figures

SYSTEM FOR THE EMERGENCY INJECTION OF LIQUID INTO A NUCLEAR REACTOR CORE

This invention relates to a nuclear reactor which is equipped with a system for emergency injection of a liquid.

In more precise terms, the present invention is directed to a nuclear reactor provided with a system which makes it possible in the event of failure of primary ducts for the admission of coolant into a water-cooled reactor to counteract any momentary and at least partial absence of said coolant water by injecting into the reactor vessel and more especially into the reactor core itself a liquid which has the intended function both of cooling the reactor core and of limiting the damage sustained by this latter.

In the event of failure of primary piping through which the coolant is supplied to the reactor vessel, depressurization of the vessel which inevitably results is even more rapid in the so-called PWR's or pressurized-water reactors. Depressurization results in considerable reduction in cooling of the fuel elements which constitute the reactor core. A desirable objective therefore consists in injecting the coolant liquid as near as possible to that portion of the reactor which has to be cooled first, or in other words the reactor core, since the injected liquid is liable to escape through the failed primary piping. The problem is especially difficult to solve in the case of reactors in which no provision is made for pressure tubes around each fuel element or assembly. In reactors of this type, the solution which is usually adopted consists in carrying out emergency injection directly into the primary ducts. This solution is unsatisfactory by reason of the fact that, in the event of reactor dryout and resultant overheating of the fuel elements, the injection liquid can penetrate into the reactor core only with great difficulty.

A more elaborate solution consists in providing the reactor vessel with peripheral water-boxes and in connecting said water-boxes to the sprinkler-tubes placed within the reactor core by means of tubes which are placed in the top portion of the reactor vessel and pass through the upper internal support structures. However, this solution makes it possible to supply only one fuel assembly out of two by reason of the space requirements of the connecting pipes.

The present invention is precisely directed to a nuclear reactor comprising a system for the emergency injection of a liquid which overcomes the disadvantages mentioned in the foregoing inasmuch as said system makes it possible both to inject the liquid directly into the reactor core and to provide a greatly simplified piping system while at the same time permitting emergency injection into all the fuel assemblies of the reactor core.

The system for emergency injection of a liquid into a nuclear reactor core essentially comprises a pressure vessel provided with nozzles for connecting pipes through which a coolant liquid is intended to be injected and discharged, the reactor core being contained by said pressure vessel and constituted by a plurality of fuel assemblies which in turn consist of a plurality of fuel elements of elongated shape. The injection system is distinguished by the fact that it comprises at least one water-box located above the reactor core and rigidly fixed to the reactor vessel, said water-box being supplied by ducts which traverse the lateral wall of said reactor vessel and by a plurality of sprinkler-tubes placed within the interior of said fuel assemblies, said sprinkler-tubes being open at the upper ends but closed at the lower ends and parallel to said fuel elements, each fuel assembly being provided with at least one of said tubes and each sprinkler-tube being connected to said water-box or to one of said water-boxes by means of a rectilinear tube.

In accordance with a further characteristic feature, the rectilinear tubes are welded at the lower ends thereof to the bottom wall of the water-box or water-boxes and are each provided at the lower end with a portion of reduced diameter which penetrates into the upper end of each sprinkler-tube.

In accordance with a second characteristic feature, each supply tube of the water-box or water-boxes is fitted with a non-return valve.

In an alternative embodiment, the reactor comprises a first and a second water-box in superposed relation, the bottom wall of one water-box being intended to constitute the top wall of the other water-box, each fuel assembly being provided with at least two sprinkler-tubes, at least one sprinkler-tube being connected to the first water-box, at least one sprinkler-tube being connected to the second water-box, the rectilinear tubes which connect the sprinkler-tubes to the upper water-box being passed through the lower water-box in leak-tight manner.

In a preferred embodiment, each fuel assembly is constituted by a plurality of fuel elements of elongated shape which are interassembled in rigidly fixed relation by means of a structure constituted by a top end-plate, a bottom end-plate and spacer grids disposed vertically at uniform intervals along the fuel assembly, said end-plates and said spacer grids being interconnected by means of hollow tubes which serve as passageways for the absorber pins of the control rods. A further characteristic feature lies in the fact that the sprinkler-tubes aforementioned have substantially the same shape as said hollow tubes and are also connected to the end-plates and to the spacer grids.

A more complete understanding of the invention will in any case be obtained from the following description of one embodiment which is given by way of example without any limitation being implied, reference being made to the accompanying drawings, in which.

The following description will be concerned with a reactor of the PWR type since the emergency injection system is the most necessary in the case of a reactor of this type although it will be clearly understood that the emergency injection system could be applied to other types of nuclear reactor.

Figure 1:
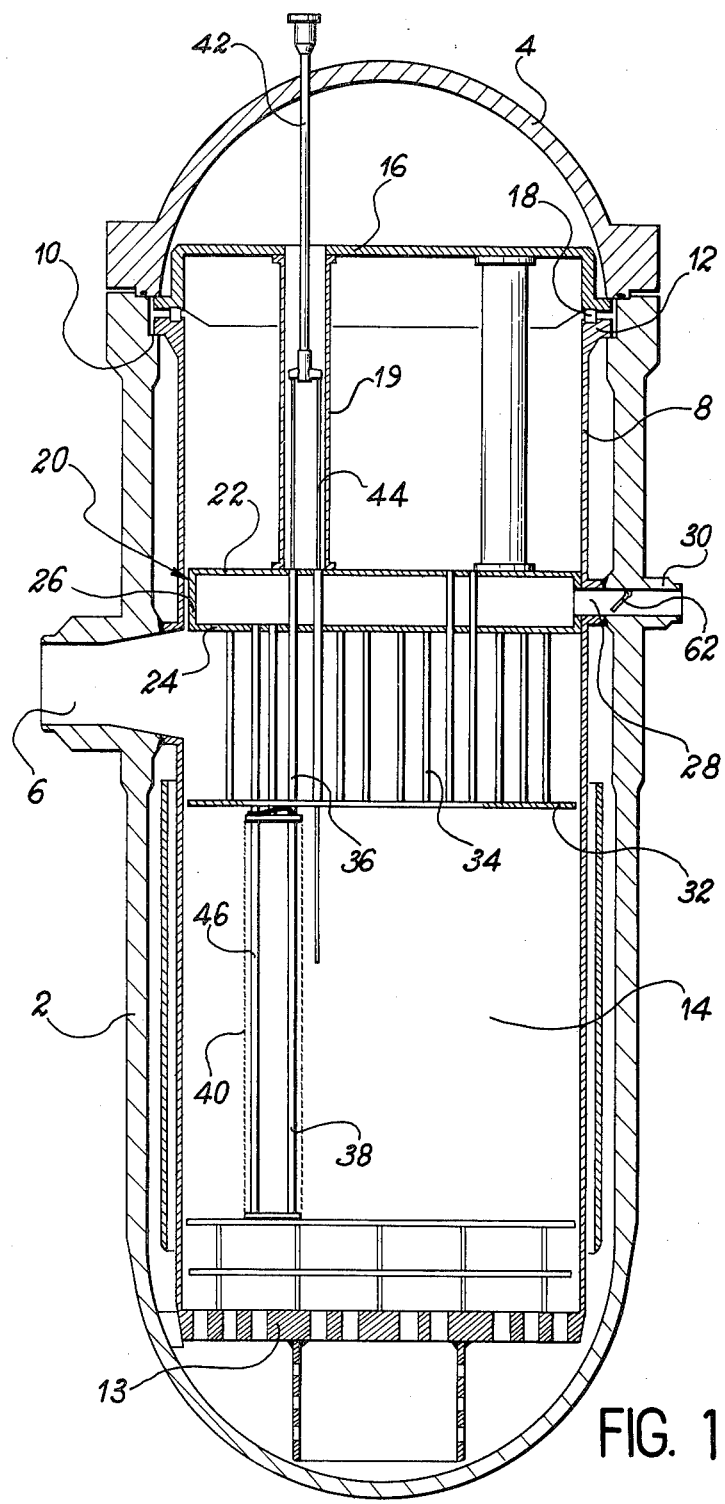
FIG. 1 is a sectional view in elevation showing a reactor together with the positional arrangement of its emergency injection system.

In FIG. 1, there is shown the reactor vessel 2 which is provided with a top closure assembly 4 and with nozzles such as the nozzle 6 for connecting the reactor vessel to the primary ducts. Provision is made within the interior of the reactor vessel 2 for the core barrel 8, the top portion of which is carried on a support ledge 10 of the reactor vessel 2 by means of the flange 12. The lower portion of the core barrel 8 is rigidly fixed to the lower support plate 13 for the reactor core 14.

The reactor further comprises an upper internal structure constituted by the upper support plate 16 which is applied at its periphery against the flange 12 of the core barrel 8 by means of elastic seals such as the seal 18. The upper support plate 16 is rigidly fixed to hollow columns such as the column 19, the lower ends of which are fixed on a water-box 20 having the general shape of a cylindrical wafer or thick disc. The water-box 20 is constituted by a top plate 22 and by a bottom plate 24, these two plates being joined together in leak-tight manner by means of a cylindrical side-wall 26. The water-box 20 is also provided with emergency fluid injection inlets such as 28 which communicate in leak-tight manner with nozzles such as 30 which are formed in the wall of the reactor vessel 2. The upper structure finally comprises the upper core plate 32 which is secured in rigidly fixed relation to the water-box 20 by means of vertical rectilinear tubes. A number of said vertical tubes such as those designated by the reference 34 have their openings at one end in the upper core plate 32 and at the other end in the water-box 20 whereas other tubes such as those designated by the reference 36 pass through the water-box 20 from one side of this latter to the other and each connect a hollow column 19 to the guide tube 38 which is placed within each fuel assembly 40.

There is also shown in FIG. 1 a reactor control rod constituted by a drive shaft 42 actuated by drive mechanisms and associated with absorber-pins such as that designated by the reference 44. The drive shaft 42 can be guided within the interior of the hollow columns 18 and the absorber-pins are guided by the tubes 36 and by the guide tubes 38 placed within the fuel assemblies. The tubes 34 are connected to tubes 46 which are rigidly fixed to the fuel assembly 40 and have substantially the same shape as the guide tubes 38 but are provided with apertures. It is therefore already apparent from this general figure that the emergency injection fluid enters the water-box 20 through the nozzles 28 and 30, that it flows under pressure within the tubes 34 and then through the tubes 46 placed inside the fuel assemblies and that it is injected into the reactor core by means of the apertures formed in the tubes 46.

Figure 2:
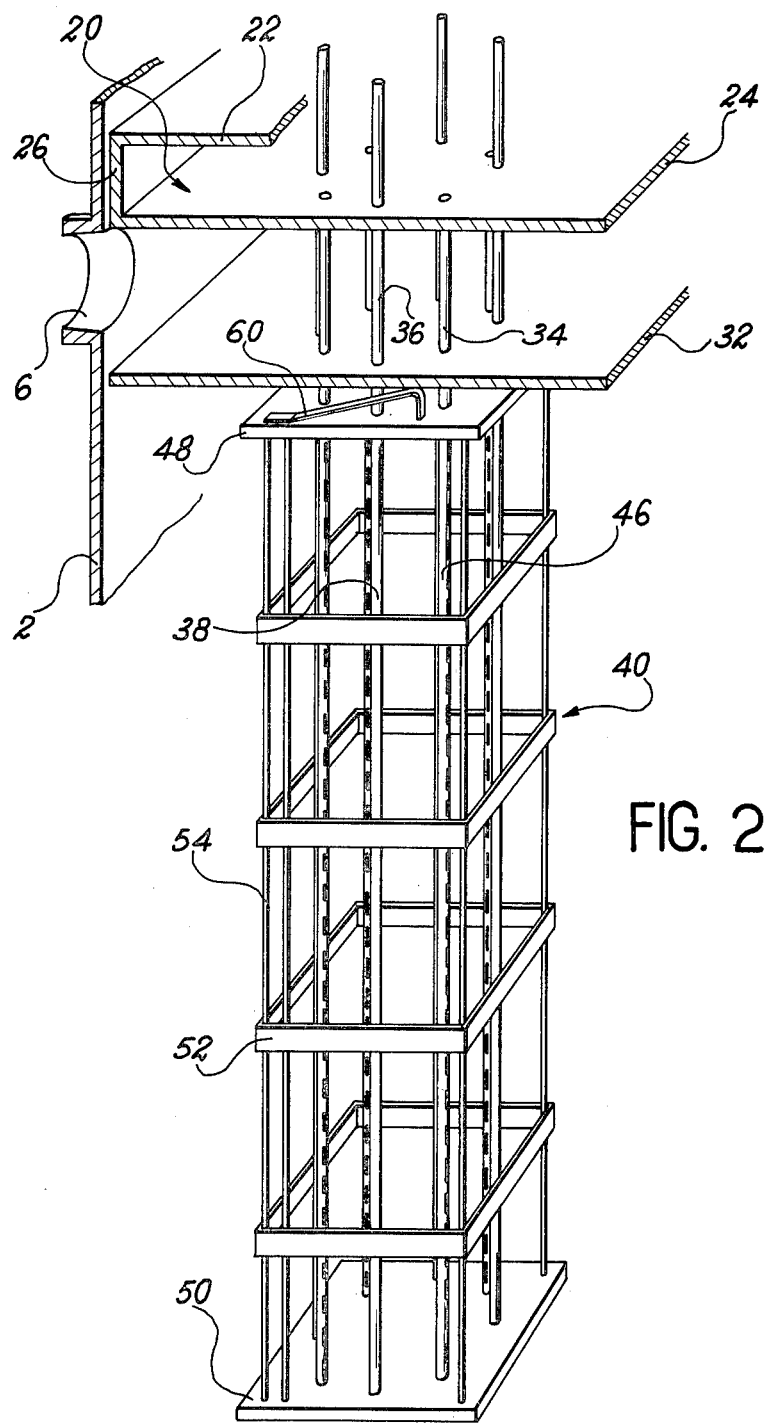
FIG. 2 is a perspective view showing the positional arrangement of the sprinkler-tubes within a fuel assembly.

FIG. 2 shows in perspective the positional arrangement of the emergency fluid injection tubes and their connections with the water-box 20. The fuel assembly 40 shown in FIG. 2 comprises a top end-plate 48, a bottom endplate 50 and spacer grids 52. The fuel assembly is endowed with structural rigidity by means of the guide tubes 38 of the absorber-pins and by means of the sprinkler-tubes 46. As has already been mentioned, these two series of tubes are connected respectively to the tubes 34 and 36, said tubes 34 being intended to open into the water-box 20 and the tubes 36 being intended to open into the hollow columns 19.

In the example herein described which corresponds to a preferred embodiment but is not given in any limiting sense, each fuel assembly comprises eight tubes which are each placed within the space occupied by four fuel pins 54 and consequently have a diameter of the order of 20 mm. Four of these tubes (38) serve to guide the control-rod absorber-pins 44 which are operated in clusters of eight for example by a mechanism placed at the top end of the drive shafts 42.

The four other tubes 46 are employed for emergency injection as has already been mentioned. Said tubes are of the sprinkler type or in other words are pierced by holes or vertical slits which are judiciously placed at intervals along said tubes in order to spray emergency injection water over the entire surface of the fuel-pin cans of one-quarter of the corresponding fuel elements. It is readily apparent that the sprinkler-tubes 46 are closed at the lower ends. Connection between the water-box 20 and the sprinkler-tube 46 is carried out by means of the tubes 34 which are welded to the bottom wall 21 of the water-box 20 into which said tubes open whereas the guide tubes 36 of the absorber-pins pass through said water-box and open into the hollow columns 19.

Figure 3:
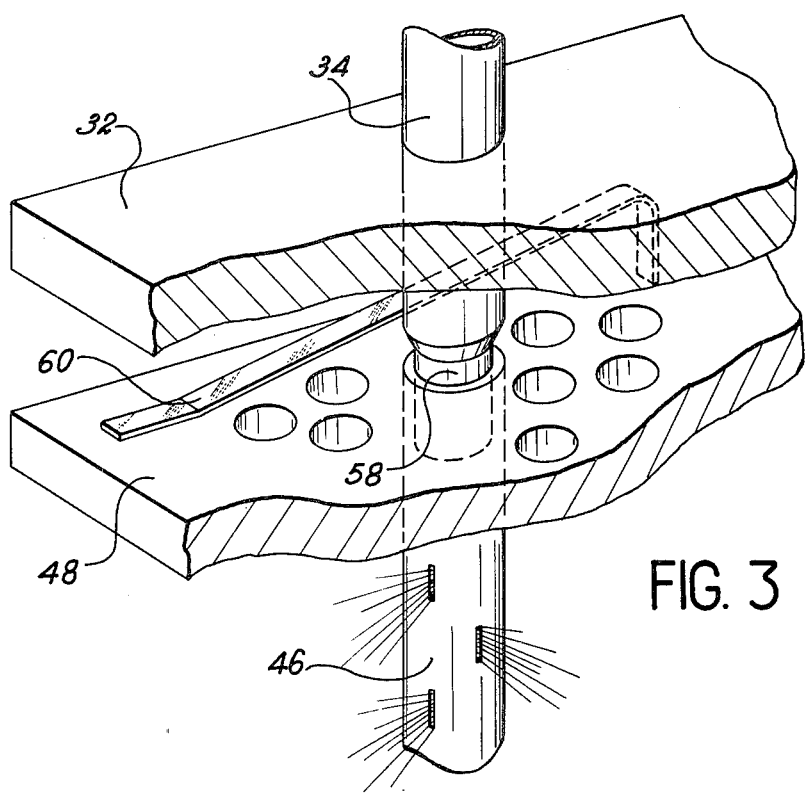
FIG. 3 is a perspective view showing the connection between the emergency-fluid supply pipes and the sprinkler-tubes which are placed within a fuel assembly.

The connection between the tubes 34 and the sprinkler-tubes 46 is shown in detail in FIG. 3 and is performed in virtually leak-tight manner so that practically the entire quantity of emergency-injection water is sprayed onto the fuel elements. To this end, the tubes 34 each terminate in a spigot 58 of smaller diameter which permits forcible fitting of the tubes 34 within the tubes 46. The length of the spigot joint must be sufficient to ensure that the tubes 34 always penetrate within the tubes 46 even in the hot state, when a relative displacement takes place between the top end-plates 48 of the fuel assembly and the upper core plate 32. Similarly, by reason of said relative displacements arising from differential thermal expansions, a resilient coupling 60 is provided between these two plates. Said coupling is usually formed by blade-springs secured to the top end-plate 48 of each fuel element. Said spring is intended to prevent "levitation" of the fuel elements under the action of the upward flow of the primary water used for normal cooling.

Each nozzle 30 for the injection of emergency fluid is fitted with a non-return valve 62 so that, in the event of failure of the emergency injection pipe (which would necessarily occur downstream of the non-return valve), the reactor vessel is not emptied through this failed pipe. This presupposes reliable operation of the non-return valves which are already closed under normal conditions of service and must not open unless the pressure drops abruptly outside the reactor vessel, where the pressure was already at its lowest value.

In the example described in the foregoing, all the fuel assemblies are supplied with emergency water from the same water-box 20. Should it be desired to ensure enhanced safety of the installation, any one fuel assembly can be supplied with emergency water from two or more superposed water-boxes. For each fuel assembly, provision is thus made for two independent emergency injection circuits in the case of two water-boxes.

Figure 4:
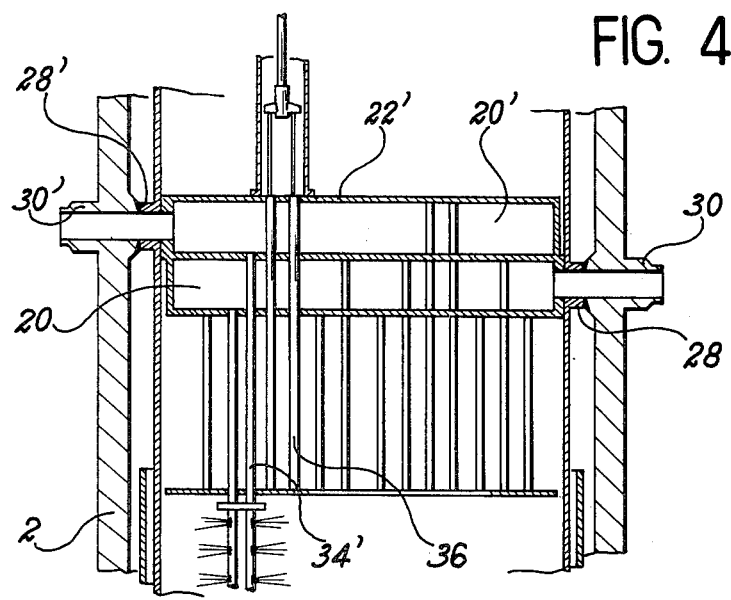
FIG. 4 is a sectional view in elevation showing an alternative form of construction of the emergency injection system of the reactor in accordance with the invention.

This optional feature is illustrated in FIG. 4 which shows two superposed water-boxes 20 and 20' (the top plate of the water-box 20' being designated by the reference 22'), the water-box 20' being supplied through the nozzles 28' and 30'. The tubes employed for the insertion of the absorber-pins clearly pass right through the two water-boxes. In the case of a given fuel assembly, the sprinkler-tubes 46 are connected in some cases to the water-box 20' by means of the tubes 34' which have their openings in said water-box 20' and in other cases to the water-box 20 as mentioned earlier. For example, two sprinkler-tubes within a given fuel assembly are supplied by the water-box 20 and the other two sprinkler-tubes are supplied by the water-box 20'.

Apart from the advantages offered by the emergency injection system in accordance with the invention as already mentioned in the foregoing (supply of emergency water to all the fuel assemblies, much greater simplicity of piping systems for the supply of emergency fluid), it is also worthy of note that the structure which has been described permits a much higher degree of strength and rigidity of superstructures. This in turn has the effect of reducing vibrations arising from circulation of the fluid; it is known that such vibrations are the cause of a large number of fault conditions which are liable to develop within a reactor vessel.

What we claim is:

1. In a nuclear pressurized water reactor of the type having a pressure vessel provided with nozzles for connecting pipes through which a coolant liquid is intended to be injected and discharged, a reactor core contained by said pressure vessel and constituted by a plurality of fuel assemblies each of which is comprised of a plurality of fuel elements of elongated shape and a plurality of imperforate hollow guide tubes for receiving absorber pins of control rods, the improvement comprising an injection system for the emergency injection of a liquid into the reactor core comprising first and second sealed water boxes extending over the entire cross sectional area of the reactor vessel in superimposed relation, the bottom wall of one water box constituting the top wall of the other water box, a supply duct for each water box extending through the lateral wall of the reactor vessel, each fuel assembly being provided with at least two sprinkler tubes having a plurality of apertures spaced along the length thereof parallel to said hollow guide tubes and fuel elements, each of said sprinkler tubes being closed at the lower end thereof with at least one sprinkler tube being connected at its upper end to said first water box by connecting means and at least one other sprinkler tube being connected to said second water box by connecting means with the connecting means which connect the sprinkler tubes to the upper water box being passed through the lower water box in leak-tight manner.

* * * * *